July 10, 1962

C. L. WHITMAN 3,043,009

PREFORMED BASE FOR ORTHODONTIC AND DENTAL CASTS
AND METHOD OF ATTACHING THE SAME

Filed Nov. 21, 1958

INVENTOR
CLIFFORD L. WHITMAN
BY Richard J. Cowling
ATTORNEY

July 10, 1962  C. L. WHITMAN  3,043,009
PREFORMED BASE FOR ORTHODONTIC AND DENTAL CASTS
AND METHOD OF ATTACHING THE SAME
Filed Nov. 21, 1958  4 Sheets-Sheet 2
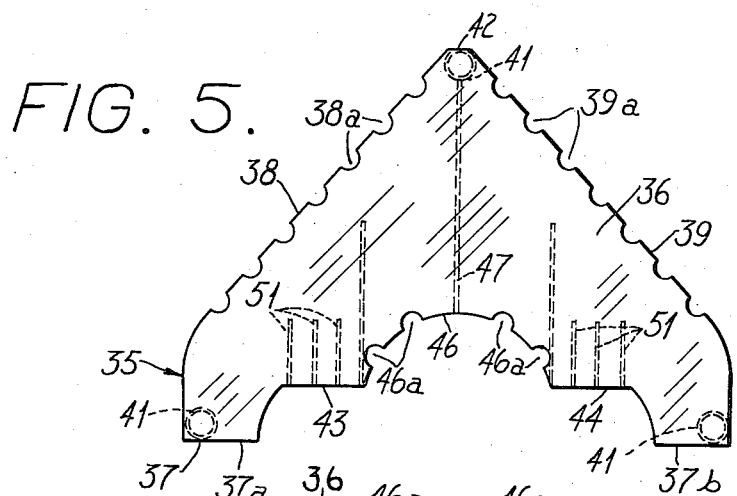
FIG. 5.
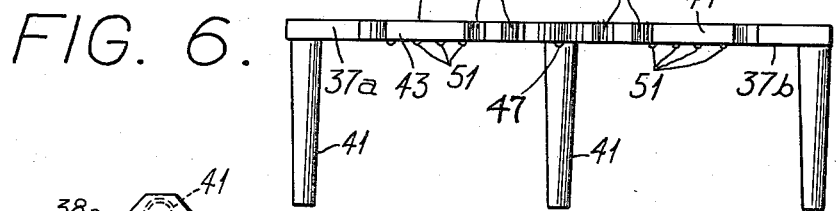
FIG. 6.
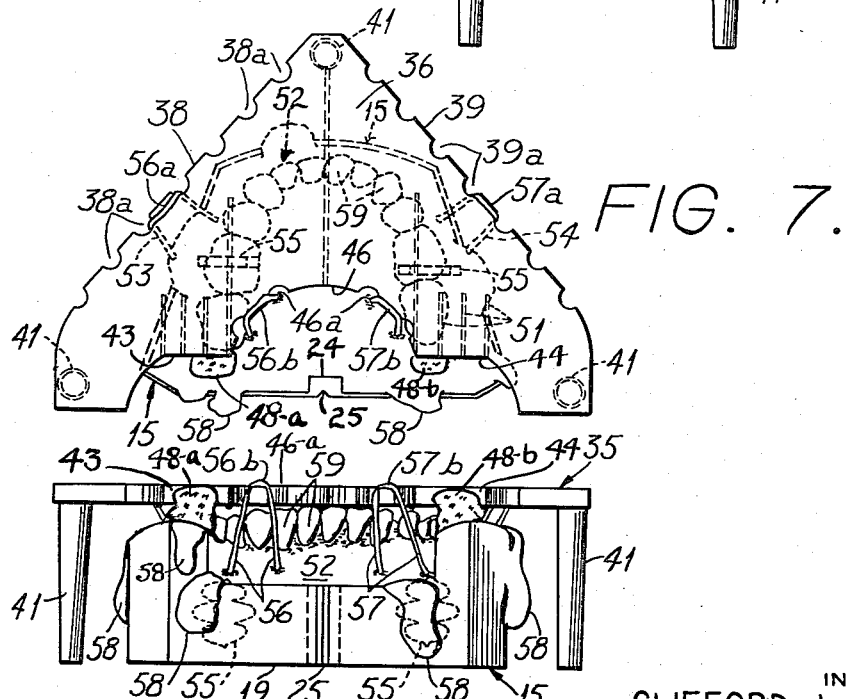
FIG. 7.
FIG. 8.
INVENTOR
CLIFFORD L. WHITMAN
BY Richard J. Cowling
ATTORNEY INVENTOR
CLIFFORD L. WHITMAN
BY Richard J. Bowling
ATTORNEY INVENTOR
CLIFFORD L. WHITMAN
BY Richard J Rawling
ATTORNEY

United States Patent Office 3,043,009
Patented July 10, 1962

3,043,009
PREFORMED BASE FOR ORTHODONTIC AND DENTAL CASTS AND METHOD OF ATTACHING THE SAME
Clifford L. Whitman, Hohokus, N.J., assignor to Whitman Laboratories, Inc., Hackensack, N.J., a corporation of New Jersey
Filed Nov. 21, 1958, Ser. No. 775,615
9 Claims. (Cl. 32—32)

The present invention relates generally to making orthodontic dental casts, and it has specific relation to a method of making such casts using a preformed finished hollow base and attaching a dental cast thereto by cementing the same therein.

Heretofore, orthodontic dental casts were either mounted on plaster bases, which had to be ground to the desired shape and finished after the dental casts were mounted thereon, or molded in preformed molds, or adjustable molds, which were later removed from the casts. These methods of mounting dental casts were difficult, tedious, expensive and time-consuming since considerable manual labor and trial-and-error methods were required to complete the same, whereby the dental casts were mounted properly and in occlusal alignment with their respective bases.

With the present invention all of the foregoing disadvantages have been obviated, and there has been provided a preformed hollow finished dental base to which a dental cast may be easily and quickly attached in an efficient and accurate manner with the use of a positioner and a relator. By the methods of the present invention, the mounting of dental casts in suitable bases can be accomplished in about one-tenth of the time and at one-third of the cost involved in the practice of either of the old methods above described.

An object of the present invention is to provide a finished preformed hollow base suitable for mounting a mandibular or lower dental cast.

Another object of the invention is the provision of a finished preformed hollow base suitable for mounting an upper or maxillary dental cast.

A further object of the invention is to provide a suitable positioner for assisting in the mounting of the lower or mandibular dental cast on its preformed hollow base.

Another object of the invention is the provision of a suitable maxillary model relator for assisting in the mounting and aligning of the upper or maxillary dental cast in articulating position on the lower or mandibular dental cast, and then moving a preformed finished hollow base into cementing position therewith.

Other and further objects and advantages of the invention, which result in simplicity, economy and efficiency, will be apparent from the following detailed description, reference being had to the accompanying drawings, forming a part hereof, wherein like numerals indicate like parts, in which:

FIGURE 5 is a top plan view of a positioning member used for the proper positioning of the lower mandibular dental cast in its preformed hollow finished base member;

FIGURE 6 is a front elevational view of the positioning member shown in FIGURE 5;

FIGURE 7 is a top plan view of the positioning member shown in FIGURE 5 with a lower or mandibular dental cast suspended thereon in its aligned articulating position;

FIGURE 8 is a rear elevational view, showing the positioning member and its aligned mandibular cast of FIGURE 7 in cementing position over the preformed finished hollow dental base member shown in FIGURE 1;

Figure 9:
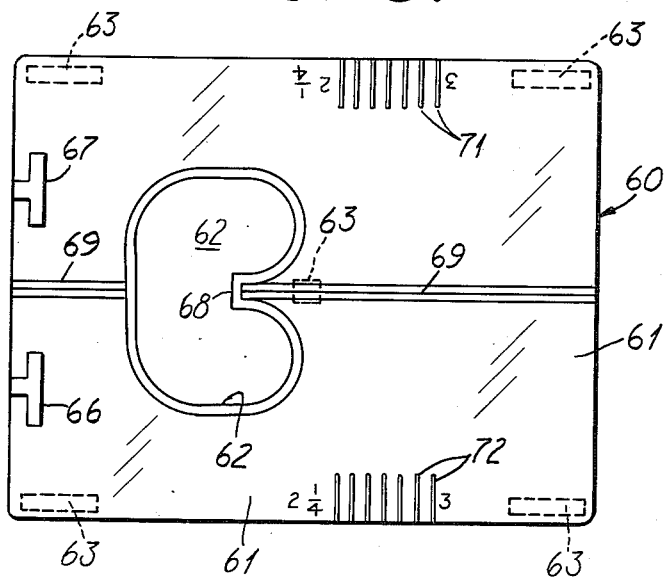
FIGURE 9 is a top plan view of a relator used for mounting the mandibular and maxillary dental casts in proper articulating relation to each other.
Figure 11:
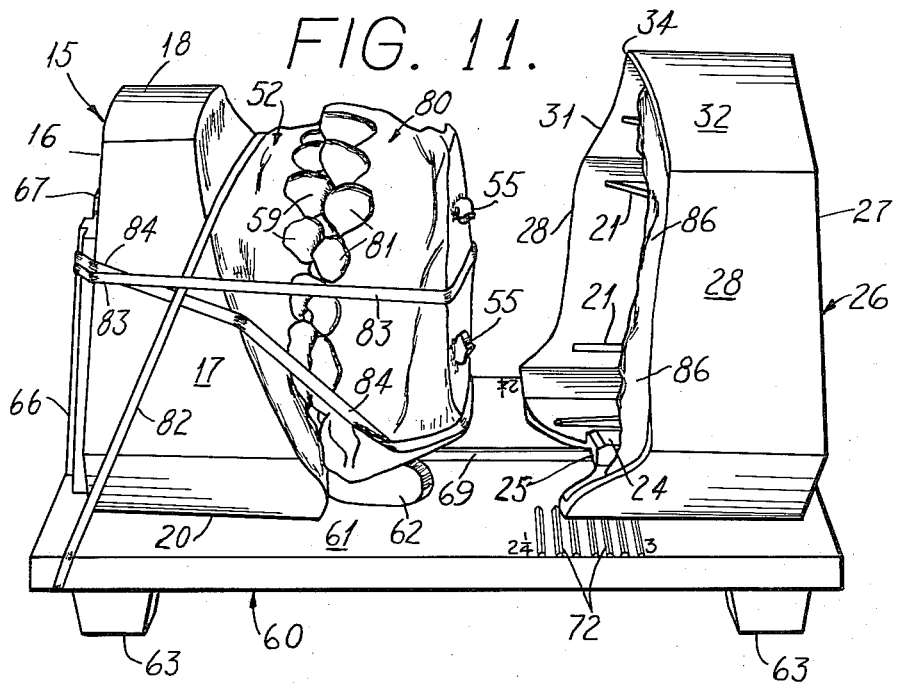
Figure 12:
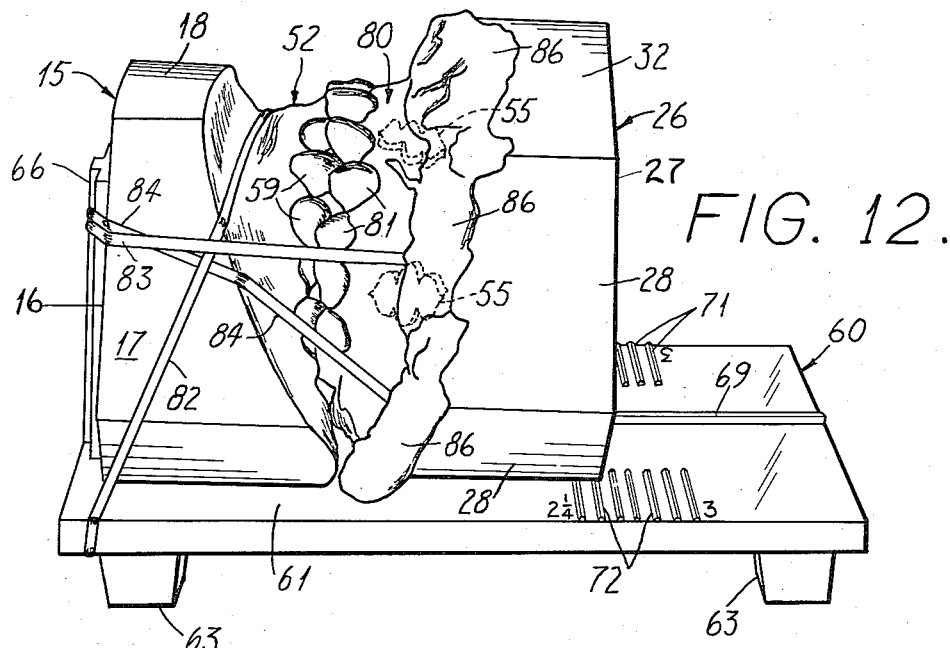

FIGURE 11 shows the lower base member and its mandibular dental cast positioned thereon on the relator member shown in FIGURE 9 with an upper dental cast positioned thereon in articulated alignment, and the upper dental base member in position thereon for sliding movement longitudinally along said relator into its final position, whereby it is to be telescopically fitted over the upper dental cast for cementing the same thereto; and FIGURE 12 illustrates the final step wherein the preformed hollow base member for the upper or maxillary dental cast is moved into position against its preformed dental cast, which has been secured in an articulating position to the mounted lower or mandibular dental cast.

Figure 1:
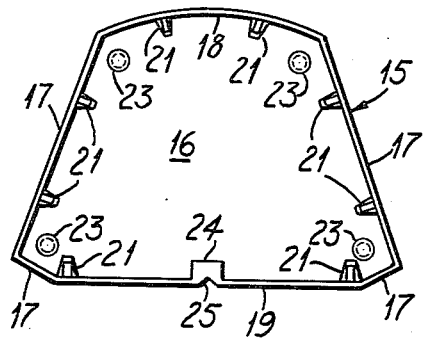
FIGURE 1 is a top plan view of a preformed finished hollow mandibular or lower base member made in accordance with the principles of the invention.
Figure 2:
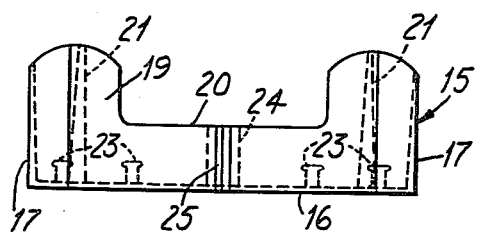
FIGURE 2 is a rear elevational view of the preformed base member shown in FIGURE 1.

Referring now to the drawings, and particularly to FIGURES 1 and 2 thereof, there is shown a finished hollow preformed base 15, which is suitable for mounting a mandibular dental cast of the lower jaw therein. This preformed base 15 is made of any suitable material, preferably an opaque white plastic material, as for example polyethylene. The base 15 is of an irregular hexagon shape, having a closed integrally formed bottom 16 and an open top. Its sides 17 extend upwardly at right angles from its bottom 16, and each is straight except for the front side 18, which is arcuate and outwardly concave. Its rear or posterior side 19 has a substantially rectangular recess 20 formed therein. Means in the form of a plurality of perimetrically spaced upwardly extending tapered rib formations, as indicated at 21, provide suitable reinforcements for the sides 17, 18 and 19 to the base member 16. There is also provided means in the form of a series of spaced upstanding mushroom-shaped projections 23 for insuring a suitable anchoring means for the plaster that is to be eventually positioned therein. Such means 23 will prevent any tendency for loosening of the plaster from the smooth plastic bottom 16 and sidewalls 17, 18 and 19 should the completed assembly be accidentally dropped or otherwise unnecessarily jolted severely.

The posterior side 19, which must be formed at a right angle to the base 16, is provided with a rectangularly shaped median rib 24, having a V-shaped notch 25 extending inwardly from its outer surface, which notch 25 functions as part of an aligning means for the mandibular dental cast on a relator to be hereinafter described.

Figure 3:
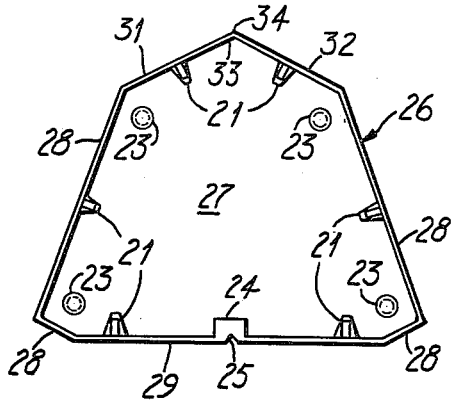
FIGURE 3 is a top plan view of a preformed finished hollow upper or maxillary base member made in accordance with the principles of the invention.
Figure 4:
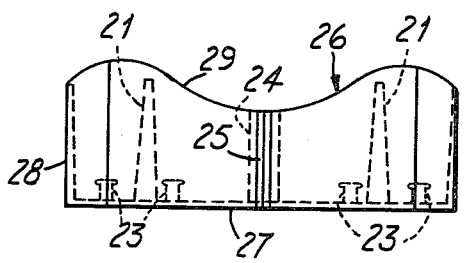
FIGURE 4 is a rear elevational view of the preformed finished base member shown in FIGURE 3.

Referring now to FIGURES 3 and 4, there is shown a finished hollow maxillary preformed base 26, which is designed for mounting a dental cast of the upper jaw therein. The base 26 is very similar in its construction to the base 15, having a closed bottom 27 and upstanding sidewalls 28. However, in this maxillary base 26 the front side is not arcuate as in the mandibular base 15, but has two straight converging sides 31 and 32, forming an acute angle 33, whose apex 34 is on its median axis. The base 26 has the same upwardly extending tapered rib formations 21, and its posterior side 29 is provided with a similar rectangularly shaped upstanding rib 24, which has a V-shaped notch 25 extending inwardly from its outer surface along its median axis, providing suitable means for its proper alignment on a relator, hereinafter to be described.

The particular shape provided for the mandibular preformed hollow base member 15 and the particular shape provided for the maxillary preformed base member 26 are arbitrary and of no special importance to the invention. A different shape is provided for each so that anyone, at a glance, may be able to distinguish the mandibular mounting from the maxillary mounting, thereby eliminating the necessity for a close inspection to determine the particular structure of the teeth mounted in said dental casts. With the exception of the posterior sides 19 and 29 of the preformed base members 15 and 26, respectively, which must at all times be at right angles to their respective bottoms 16 and 27, the remaining sides, their shapes and angular features have been selected for esthetic reasons and because they provide base members in proportion to the size and shape of the dental casts which they will be receiving.

There is shown in FIGURE 5 a mandibular model positioner 35, which consists of a thin flat plate member 36, being substantially triangular in shape and having three distinct sides 37, 38 and 39. Mounted on the under side of the plate member 36 are a series of depending tapered legs 41, circular in cross-section, which serve to position the plate member 36 in spaced relation to its supporting surface. This mandibular positioner 35 may be made of any suitable material, but preferably a clear transparent plastic, such as for example, polystyrene.

The converging sides 38 and 39 each have a series of semi-circular indentations or notches 38a and 39a spaced longitudinally thereof, the indentations or notches along one side being in transverse alignment with the indentations or notches of the other side. The posterior side 37 has spaced straight portions adjacent each end, as indicated at 37a and 37b, but is recessed inwardly intermediate said straight portions to provide a second inner pair of spaced straight edges 43 and 44, which in turn are separated by an inwardly extending arcuately shaped concave recessed portion 46. The straight edges 43 and 44 provide buttress points or stops, which are adapted to engage the retromolar areas 48a and 48b of a conventional dental cast.

It will be noted that the plate member 36 has extending inwardly and longitudinally from each of the straight edges 43 and 44 of its posterior side 37 a series of transversely spaced lines of indicia 51, which serve to indicate the transverse alignment of a mandibular cast thereon with respect to its median axis 47. The indicia 51 may be integral ribs, score lines, etc., whichever is most expedient to use in making the model positioner 35.

A mandibular dental cast 52, which has previously been made in a conventional manner and provided with a series of outwardly projecting spurs, spuds or locking devices 55, (see FIGURE 8) is now ready to be mounted on its preformed and finished hollow base 15. The projecting spurs, spuds or locking devices 55 serve to assist in anchoring the dental cast 52 to the plaster in its preformed hollow base member 15. The dental cast 52 is suitably positioned under the plate 36 by using conventional rubber bands 56 and 57, whose ends 56a and 56b and 57a and 57b, respectively, are looped over adjacent notches spaced perimetrically of the plate 36. For example, the end 56a of the rubber band 56 is stretched between adjacent spaced notches 38a of the side 38, and the opposite end 56b of said band 56 is then stretched over the spaced notches 46a of the arcuate portion 46. One end 57a of the band 57 may then be stretched between the adjacent spaced notches 39a, and its opposite end may be stretched over the dental cast 52 and looped over a pair of spaced notches 46a of the arcuate portion 46. These bands 56 and 57 will serve to hold removably the mandibular dental cast 52 with its teeth 59 tightly against the underside of the plate member 36 in a plane parallel to the base 19 thereof, while permitting its manual adjustment for the proper alignment and centering with its indicating indicia 51.

The mandibular dental cast 52 is moved forwardly under the plate 36 until its retromolar areas 48a and 48b engage the straight edges 43 and 44, respectively. Then the indicia 51 may be used as a guiding means for centering the dental cast 52 along the median axis 47 of the plate member 36. It will be appreciated that any number of rubber bands or other suspending means may be employed for mounting the mandibular dental cast 52 on the positioning member 35, and that any series of notches may be employed to suspend said mandibular dental cast 52 under said model positioner 35, without departing from the spirit of the invention.

The rubber bands 56 and 57 may be removed from the assembly when the plaster 58 has become set, but not completely hardened. They are removed by cutting them and pulling them out since the longitudinal stretching of the rubber reduces its cross-section, permitting ready withdrawal without damage to the assembled cast 52 in its preformed finished base 15.

As shown in FIGURE 7, the mandibular dental cast 52 is positioned in proper alignment on its mandibular model positioner 35, and is now ready to be brought into cementing relation with the soft plaster 58 contained within its hollow preformed and finished base member 15. The soft plaster 58 has the consistency of putty, being pliable or flowable, but at the same time viscous enough to permit the hollow base member 15 to be turned on its posterior side 19 without danger of the same running out until the dental cast 52 can be partially pressed or submerged therein.

The height of the legs 41 of the mandibular model positioner 35 is sufficient, when it is positioned directly over the finished hollow preformed base member 15, for the dental cast 52 to be suspended thereover for mounting on said base member 15. When the dental cast 52 is positioned properly over the plaster filled preformed hollow base 15, the two are pressed firmly together, bringing the top edges of the teeth 59 of the dental cast 52 against the underside of the top plate 36 of the model positioner 35.

As shown in FIGURE 8, the excess plaster 58 contained within said hollow base 15 is exuded outwardly over the sides 17 and 39 and through the recessed portion 20. These drippings of the excess plaster 58, which were exuded under pressure used in bringing the dental cast 52 into contact with the preformed hollow base 15, may be wiped off with a damp rag. The assembly is then allowed to dry and harden at normal room temperatures, and, when dry, there is provided a desirable esthetic mounting for a dental cast, which requires no further grinding, polishing and/or finishing. It will be appreciated that the underside of the plate 36 insures that the top edges of the teeth 59 in the dental cast 52 will be maintained in their proper occlusal plane and in a plane parallel to the closed bottom 16 of the mandibular hollow base 15.

Figure 10:
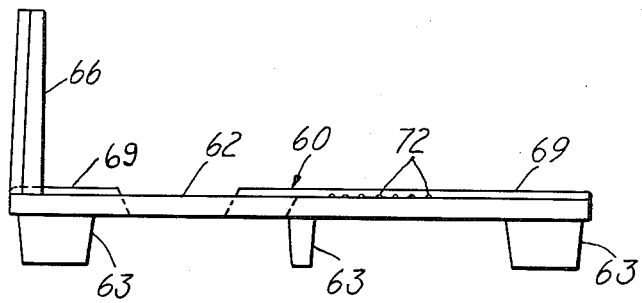
FIGURE 10 is a side elevational view of the relator shown in FIGURE 9.

Referring now to FIGURES 9 and 10, there is shown a maxillary model relator 60, which consists of a rectangular plate member 61, having an irregular opening 62 therethrough, and a series of spaced supporting legs 63. The plate member 61 may be made of any suitable material, but preferably a clear transparent plastic, such as for example, polystyrene. Adjacent the front side of the plate member 61 and mounted thereon are a pair of upwardly extending columns or ribs 66 and 67, which extend upwardly a distance sufficient to provide a suitable right angle buttress support for a preformed dental base 15 standing on its posterior side 19, as best shown in FIGURES 11 and 12, on said plate 61.

The irregular opening 62 in the plate 61 is substantially straight along its front and sides, but its rear edge curve inwardly from the opposite sides to form an inwardly extending projection 68 along its longitudinal axis. Indicia means 69 is provided along said axis for indicating the same, which means is a V-shaped upstanding rib. Additional visual indicating means 71 and 72 are provided on the plate member 61 between the rear edge of the opening 62 and the rear end of the plate 61. These means 71 and 72 form a scale for measuring the height of the assembly when the final hollow base 26 is telescopically positioned over the maxillary dental cast 80, having teeth 81. With these additional visual indicator means 71 and 72, it is possible to make each articulated set of dental bases 15 and 26 with their respectively mounted dental casts 52 and 80 the same height. Such means also serves to assist in lining-up the hollow base 26 at right angles to the longitudinal axis of the model relator 60.

Referring now to FIGURES 11 and 12, there is shown one method by which the upper and lower dental casts 52 and 80 may be mounted in an articulated relation with the use of the maxillary model relator 60, forming a part of this invention, whereby the occlusal plane for the teeth 81 of the maxillary dental cast 80 will be positioned in a plane that is parallel to the bottom 27 of its hollow dental base 26.

The finished dental base 15, with its mandibular dental cast 52 mounted permanently therein, is now positioned on the maxillary model aligner 60, with its closed bottom 16 tightly positioned in a vertical arrangement against the rear surfaces of the upstanding columns or ribs 66 and 67. In this position, the V-shaped notch 25 engages slidably the means in the form of a V-shaped rib 69 extending along the longitudinal axis of the plate member 61 of the maxillary model aligner 60, thereby assuring its proper centering thereon.

A maxillary dental cast 80, which has previously been made in a conventional manner and having a plurality of projecting spurs, spuds or locking devices 55, is now ready to be mounted in articulated relation on the mandibular dental cast 52. This is done manually. The preformed maxillary dental cast 80 is mounted and secured in its proper articulated position to the mandibular dental cast 52 by means of conventional rubber bands 82, 83 and 84. Manifestly, other means, such as string, wire or clamps may be used, if desired, to secure the preformed maxillary dental cast 80 to the mandibular dental cast 52 without departing from the spirit of the invention. A rubber band 82 may be looped and stretched around the top or front end of the maxillary preformed base member 15 and around the underside of the model aligner 60 to secure the assembly tightly to the plate 61 of the positioner 60. The bands 83 and 84 are looped and stretched around the base of the mandibular dental cast 80, around the maxillary preformed base 15 and around the upstanding columns 66 and 67, thereby securing these several members together against said columns.

With the preformed base 15 and its permanently attached mandibular dental cast 52 secured fixedly but removably to the posts 66 and 67 of the relator 60 by means of the rubber band 82, and with the maxillary dental cast 80 with its teeth 81 positioned in articulating relation to the teeth 59 of the mandibular dental cast 52 by means of the rubber bands 83 and 84, the preformed and finished maxillary base member 26 is now ready to be attached to its maxillary dental cast 80. Obviously, the hollow interior of the base member 26 must be filled with a suitable quantity of soft, pliable plaster 86 before it is to be placed on the plate 61 of the relator 60. The posterior side 29 of the base member 26 is then positioned over the plate member 61 of the relator 60 with its V-shaped notch 25 centered on the V-shaped rib 69, thereby assuring a proper centering and alignment with the base member 15. The base member 26 is now moved manually forwardly along said centering rib 69 until its soft plaster filling 86 is brought into contact with the base of the dental cast 80. The visual indicating means 71 and 72 serve to show whether the base member 26 is maintained in a proper transverse alignment during its movement over the rib 69, and at the same time indicates the total height of the assembly, so that no ruler or other measuring device is needed to determine the overall height of the articulated dental cast assembly.

The pressure to be exerted on the soft pliable plaster 86 in the maxillary dental base 26 by the telescoping of the same over the maxillary dental cast 80 mounted on the mandibular dental cast 52 will cause any excess and unnecessary plaster 86 contained in the base member 26 to be exuded therefrom, as best shown in FIGURE 12. Such excess plaster 86 as may be exuded from the bottom edge 29 of the base member 26 will drop through the opening 62 in the plate 61 of the relator 60. While the cementing material is still soft and pliable, any excess thereof not falling entirely free of the base 26 may be wiped therefrom with a damp cloth. The aligned dental bases 15 and 26 with their respective dental casts 52 and 80 are allowed to remain on the relator 60 until the plaster 86 becomes set. Whereupon it may be disassembled and there will be provided separable finished dental bases 15 and 26 with their respective dental casts 52 and 80 mounted permanently therein. In disassembling the assembly, the rubber bands 82, 83 and 84 are cut, and then they may be easily and readily pulled free of the set plaster 86 since any longitudinal stretching of such bands has a tendency to reduce the cross-sectional area of the rubber, facilitating their withdrawal without damage to the dental bases.

It will be appreciated that with the use of the maxillary model relator 60, the dental casts 52 and 80 have been mounted in such a manner in their respective base members 15 and 26 that, when brought together, the teeth 59 and 81 of each will be in a proper articulating position.

Obviously, if desired, the two finished dental bases 15 and 26 may be secured together with their respective teeth in an articulating position by means of a suitable hinge (not shown).

Although I have described in detail and illustrated in the drawings but one form which the invention may assume, it will be readily apparent to those skilled in the art that the same need not be so limited, but that various modifications may be made therein without departing from the spirit thereof.

What I claim is:

1. A molded and finished dental base for use in mounting preformed dental casts which comprises a preformed molded shell of an integral construction having a closed bottom, upstanding sidewalls including a posterior side which is formed at a right angle to the bottom and an open top, a series of spaced upstanding anchoring projections therein formed integrally with said closed bottom and a median rib formed integrally with and inwardly of its posterior side, said rib having a notch extending inwardly from the outer surface of the posterior side which functions as a part of an aligning means for mounting preformed dental casts.

2. A molded and finished dental base for use in mounting preformed dental casts which comprises a preformed molded shell of an integral construction having a closed bottom, upstanding sidewalls and an open top, said shell having a plurality of perimetrically spaced upstanding ribs therein formed integrally with said closed bottom and upstanding sidewalls, and said shell having a plurality of mushroom-shape upstanding projections spaced on its closed bottom.

3. A mandibular model positioned comprising a plate member mounted on a plurality of legs, spaced means on said plate for securing fastening members thereto, the posterior edge of said plate having a recessed portion intermediate its ends, said recessed portion having spaced means for engaging the retromolar areas of a dental cast, and spaced means for securing fastening members thereto.

4. A mandibular model positioner comprising a triangularly shaped plate member mounted on a plurality of legs, spaced means in the form of a series of longitudinally spaced notches along the converging sides of said plate for securing fastening members thereto, the rear edge of said plate having a recessed portion intermediate its ends, said recessed portion having straight edges adjacent its opposite ends for engaging the retromolar areas of a dental cast positioned thereon, and a second recessed portion between said straight edges, said second recessed portion having a series of perimetrically spaced notches for securing fastening members thereto.

5. A mandibular model positioned comprising a triangularly shaped plate member mounted on a plurality of legs, spaced means along the converging sides of said plate for securing fastening members thereto, the posterior edge of said plate having a recessed portion intermediate its ends, said recessed portion having spaced means for securing fastening members thereto, means for indicating the median axis of said positioner, and transversely spaced means extending longitudinally of said positioner on opposite sides of said median axis for indicating the longitudinal position of a preformed dental base to be suspended thereunder.

6. A maxillary model relator having a flat plate of substantial length as compared to its width dimensions, an opening therethrough intermediate its ends, a buttress formation adjacent one end thereof projecting above said plate, means for indicating the median axis of said plate, and a plurality of longitudinally spaced visual indicating means extending transversely of said plate between said opening and its opposite end for indicating the transverse alignment and thickness of a dental assembly when the same is positioned on said plate.

7. A maxillary model relator having a flat plate of substantial length as compared to its width dimensions, an opening therethrough intermediate its ends, a buttress formation projecting above said plate adjacent its front end, means including an upwardly projecting rib extending longitudinally of the median axis of said plate, and means including a plurality of longitudinally spaced upwardly projecting ribs extending transversely of said plate for indicating the transverse alignment and thickness of a dental assembly mounted on said longitudinally projecting rib.

8. The method of mounting upper and lower dental casts which comprises the steps of cementing a lower dental cast in a proper position on a preformed finished base, mounting an upper dental cast in articulating position on said lower dental cast, filling a preformed finished base for an upper dental cast with a soft cementing composition, aligning said filled plastic base with said upper dental cast, telescopically moving said filled plastic base into contact with said upper dental cast, whereby any excessive cementing composition is exuded from said base, and then allowing said cement to harden.

9. The method of mounting upper and lower dental casts which comprises filling a preformed hollow dental base with a soft cementing material, mounting a lower dental cast therein by pressing the same against said cement, while holding its teeth in an occlusal plane parallel to bottom of said base whereby the excess cementing material is exuded therefrom, allowing the cementing material to harden to secure the dental cast therein, mounting an upper dental cast in articulating position on said lower dental cast, filling a second preformed hollow dental base with a soft cementing material, bringing said filled dental base into telescopic contact with said mounted upper dental cast, whereby any excess cementing material is exuded from said base, allowing said cementing material to harden to secure the upper dental cast therein, and then disassembling said preformed bases whereby each dental cast is mounted in its preformed dental base in an articulating position to the other.

References Cited in the file of this patent

UNITED STATES PATENTS

| | | |
|---|---|---|
| 1,666,021 | Phillips | Apr. 10, 1928 |
| 2,106,125 | Roebuck et al. | Jan. 18, 1938 |
| 2,786,272 | Lindley | Mar. 25, 1957 |